(12) United States Patent
Ogle et al.

(10) Patent No.: US 7,244,322 B2
(45) Date of Patent: *Jul. 17, 2007

(54) METHOD FOR FORMING FIRE COMBUSTION MODIFIED BATT

(75) Inventors: Steven Ogle, Murfreesboro, TN (US); Karl Van Becelaere, Nashville, TN (US)

(73) Assignee: L&P Property Management Company, South Gate, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/968,318

(22) Filed: Oct. 18, 2004

(65) Prior Publication Data

US 2006/0083911 A1    Apr. 20, 2006

Related U.S. Application Data

(63) Continuation of application No. 10/221,638, filed as application No. PCT/US01/07831 on Mar. 13, 2001, now Pat. No. 7,147,734.

(60) Provisional application No. 60/188,979, filed on Mar. 13, 2000.

(51) Int. Cl.
  *D04H 1/12*  (2006.01)
  *D04H 1/42*  (2006.01)

(52) U.S. Cl. .................. 156/62.2; 156/62.8; 264/122; 442/414; 442/415

(58) Field of Classification Search .................. None
See application file for complete search history.

(56) References Cited

U.S. PATENT DOCUMENTS 3,616,124 A    10/1971    Danhel et al.
4,152,782 A     5/1979    Kincaid
4,211,817 A     7/1980    Buck, Jr. et al.

(Continued)

FOREIGN PATENT DOCUMENTS

JP    62170520    7/1987

(Continued)

OTHER PUBLICATIONS

Supplementary European Search Report, EP 01 91 8563, Sep. 22, 2004, 2 pgs.

(Continued)

*Primary Examiner*—Sam Chuan C. Yao
(74) *Attorney, Agent, or Firm*—Conley Rose, P.C.; Kristin Jordan Harkins

(57) ABSTRACT

The present invention relates to a method for forming a fire combustion modified batt. The method comprises the step of forming a blend of nonwoven and oxidized polyacrylonitrile fibers into a web. The oxidized polyacrylonitrile fibers are fire resistant and when blended with nonwoven fibers are relatively easily processed into a batt. A second blend of nonwoven fibers can be formed into a web and layered with the oxidized polyacrylonitrile fiber web to form the batt. The fibers are bonded together with heat, resin or other bonding material and are compressed and cooled. The fire combustion modified batt is useful as fire barriers and fillers in bedding, upholstery and vehicle and aircraft seats, as insulators for apparel, appliances, walls and ducting, as barriers to separate control systems from a heat source, and as components in fire safety gear such as race driver suits and oven and welding mitts.

6 Claims, 7 Drawing Sheets

U.S. PATENT DOCUMENTS

| | | |
|---|---|---|
| 4,217,386 A | 8/1980 | Arons et al. |
| 4,540,617 A | 9/1985 | Kawanishi et al. |
| 4,753,693 A * | 6/1988 | Street .................. 156/62.8 |
| 4,818,586 A | 4/1989 | Smith et al. |
| 4,863,797 A | 9/1989 | Ichibori et al. |
| 4,865,906 A * | 9/1989 | Smith, Jr. .................. 442/197 |
| 4,869,962 A | 9/1989 | McCullough, Jr. et al. |
| 4,879,168 A | 11/1989 | McCullough, Jr. et al. |
| 4,902,563 A | 2/1990 | McCullough, Jr. et al. |
| 4,943,478 A | 7/1990 | McCullough, Jr. et al. |
| 4,950,533 A | 8/1990 | McCullough, Jr. et al. |
| 4,970,111 A | 11/1990 | Smith, Jr. |
| 5,188,896 A * | 2/1993 | Suh et al. .................. 428/397 |
| 5,208,105 A | 5/1993 | Ichibori et al. |
| 5,275,875 A | 1/1994 | Suh et al. |
| 5,279,878 A | 1/1994 | Föttinger et al. |
| 5,348,796 A | 9/1994 | Ichibori et al. |
| 5,399,423 A | 3/1995 | McCullough et al. |
| 5,407,739 A | 4/1995 | McCullough et al. |
| 5,503,915 A | 4/1996 | Ichibori et al. |
| 5,503,916 A | 4/1996 | Ichibori et al. |
| 5,503,929 A | 4/1996 | McCullough, Jr. et al. |
| 5,506,042 A | 4/1996 | Ichibori et al. |
| 5,578,368 A | 11/1996 | Forsten et al. |
| 5,582,905 A * | 12/1996 | Beck et al. .................. 428/74 |
| 5,741,380 A | 4/1998 | Hoyle et al. |
| 5,776,607 A | 7/1998 | McCullough |
| 5,837,626 A | 11/1998 | McCullough |
| 6,021,523 A | 2/2000 | Vero |
| 6,287,686 B1 | 9/2001 | Huang et al. |
| 6,358,608 B1 | 3/2002 | Hanyon et al. |
| 6,383,623 B1 | 5/2002 | Erb, Jr. |
| 6,823,548 B2 | 11/2004 | Murphy et al. |
| 2004/0198125 A1 | 10/2004 | Mater et al. |
| 2005/0233668 A1 | 10/2005 | Ogle et al. |
| 2006/0040580 A1 | 2/2006 | Ogle et al. |
| 2006/0083911 A1 | 4/2006 | Ogle et al. |

FOREIGN PATENT DOCUMENTS

| | | |
|---|---|---|
| JP | 7278962 | 10/1995 |
| WO | WO 200168341 A1 * | 9/2001 |
| WO | WO 03/023108 A1 | 3/2003 |

OTHER PUBLICATIONS

International Search Report, PCT/US01/07831, Jun. 7, 2001, 1 pg.

* cited by examiner

METHOD FOR FORMING FIRE COMBUSTION MODIFIED BATT

This application is a Continuation of Nonprovisional U.S. Patent Application Ser. No. 10/221,638, filed Jan. 7, 2003 now U.S. Pat. No. 7,147,734 which is based upon International Patent Application PCTUS01/07831, filed Mar. 13, 2001, which, in turn, is based on and claims priority to U.S. patent application Ser. No. 60/188,979, entitled Bi-Lofted Fire Combustion Modified Batt filed on Mar. 13, 2000.

FIELD OF THE INVENTION

The present invention relates to a method for forming a fire combustion modified batt. More particularly, the method includes the step of forming a blend of nonwoven fibers and charring fibers, such as oxidized polyacrylonitrile (PAN) fibers into a web. The charring fibers are fire resistant and when blended with nonwoven fibers are relatively easily processed into a batt. A second blend of nonwoven fibers can be formed into a web and layered with the web of charring fibers and nonwoven fibers to form the batt. The fibers of the batt are bonded together with heat, resin or other suitable bonding means and are compressed and cooled to set the batt. The fire combustion modified batt is useful as a fire barrier layer and filling in bedding,-upholstery and vehicle and aircraft seats, as insulators for apparel, appliances, walls, vehicle walls and ducting, as barriers to separate control systems from a heat source, and as components in fire safety gear such as race driver suits, oven and welding mitts, and the like.

BACKGROUND OF THE INVENTION

Fire retardant barriers are desirable for a wide variety of applications. Products for household and public occupancies such as health care facilities, convalescent care homes, college dormitories, residence halls, hotels, motels and correctional institutions are sometimes governed by regulations which require certain fire resistant characteristics, particularly in bedding and upholstery. Fire barrier components are also needed in apparel, fire safety gear, vehicle and aircraft seating and walls, as insulators for appliances, walls, ducting, as barriers to separate sensitive controls from a heat source and other similar applications where fire safety is a concern. Effective fire barriers minimize the amount and rate of heat released from the barrier upon contact with fire. The rate of heat released is an indication of the intensity of the fire generated from the fire barrier material as well as how quickly the fire spreads. Slowing the spread of fire advantageously increases the amount of response time for a fire victim to safely escape and a fire department to successfully extinguish the fire.

In the bedding, upholstery and other industries, foams and nonwoven fibers are used in mattresses, sofas, chairs, and seat cushions, backs and arms. Traditionally, urethane foam has been combined with other types of cushioning materials such as cotton batting, latex rubber, and various nonwoven fibers in order to impart desirable comfort, loft and durability characteristics to a finished product. However, urethane foam is extremely flammable and must be chemically treated or coated to impart fire resistant properties to the foam. Alternatively, neoprene foam is used in bedding and upholstery products as it is relatively fire resistant. Both neoprene foam and urethane foam which have been treated for fire resistancy are relatively expensive.

Synthetic and natural nonwoven fibers also have demonstrated usefulness in the construction of mattresses and upholstery. Such fibers are inherently lightweight and therefore easy to ship, store and manipulate during processing. When subjected to open flame, many synthetic fibers, particularly polymer fibers and specifically dry polyester fibers, tend to melt and drip rather than burn. In addition, polymer fibers can be coated for fire resistance. For example, polymer fibers which have been treated for fire resistance are identified in the industry under the names Trevira FR, Kevlar and Nomex and are considered to be non-flammable.

Correctional institutions typically use three types of cushion cores for mattresses. The cushion cores include foam, densified synthetic nonwoven fiber which has a density of about 1.5 pounds per cubic foot or greater, and cotton batting. Left untreated, cotton fibers are extremely flammable and burn rapidly. Cotton can, however, be chemically treated, typically with boric acid, to impart fire resistant properties to the cotton. Correctional institutions with heightened fire safety concerns may require their mattresses to meet certain fire safety standards. In these cases, the cushion cores are comprised of neoprene foam or cotton batting which has been treated with boric acid. However, cotton is extremely moisture absorbent. Thus, mattresses comprised of cotton are difficult to maintain in a hygienic condition. Furthermore, cotton mattresses are relatively heavy.

Oxidized polyacrylonitrile (PAN) fibers, while fire resistant, are difficult to process into batts for use as a barrier layer or filling, particularly in bedding and upholstery applications. The fibers are relatively low in weight and specific gravity making traditional carding methods for forming batts difficult. In addition, oxidized PAN fibers are so-called dead fibers as they have relatively little resilience and loft and are incompressible. In certain applications, in particular for bedding and upholstery, a oxidized PAN fiber batt may be unsuitable where comfort and loft are desired. Oxidized PAN fibers are also black in color and thus may be unsuitable in applications which require a light color beneath a light decorative upholstery or mattress layer.

SUMMARY OF THE INVENTION

Through significant time and effort, it has been found that the difficulties associated with providing a fire barrier layer could be avoided by the method and batt of the present invention. As will be appreciated by one skilled in the art, the novel method and batt are applicable to a wide variety of products, including as barrier layers and filling materials in bedding and upholstery, as wraps for and replacements of cushion and arms in furniture, vehicle and aircraft seats, as insulators for apparel, appliances, walls, vehicle walls, ducts and to separate sensitive controls from a heat source, and as components in fire safety gear such as oven or welding mitts, and the like.

The method of the present invention comprises the steps of blending carrier and binder nonwoven fibers and oxidized polyacrylonitrile (PAN) fibers to form a substantially homogeneous blend of the fibers. The binder fibers have a relatively low melting point and the carrier fibers have a relatively high melting point. While the homogeneous mixture can be any of a number of suitable blends, in one embodiment, the binder fiber can be anywhere in the range of about 5 percent to 50 percent by volume of the blend. The relative percent volume of oxidized PAN fibers to carrier fibers in the remaining blend volume ranges anywhere from 15 percent to 85 percent. In a preferred embodiment, the relative volume of oxidized PAN fibers to carrier fibers is about 50 percent to 50 percent. Thus, for a blend having 10 percent by volume of binder fibers and a 50 to 50 percent relative volume of oxidized PAN fibers to carrier fibers, the volume of oxidized PAN fibers and carrier fibers in the blend is 45 percent each.

The blended fibers are formed into a batt by using a garnett machine, cross layers, an air layer or any other suitable batt forming apparatus. In a garnett and cross laying process, the blend of fibers are formed into a web for transporting along a conveyor moving in the machine direction. Successive web layers are layered in the cross direction onto the conveyor in an progressive overlapping relationship by moving one or more reciprocating cross-lappers carrying the web back and forth between a first side of the conveyor and an opposing second side.

The batt is positioned on an air permeable support and a vacuum is applied through the air permeable support and batt from a first side of the batt to an opposing second side of the batt. The vacuum pressure is sufficient to substantially compress the web into a desired thickness or loft and at a desired density. In an alternative embodiment, the batt is compressed between opposing counter rotating rollers proximate the machine direction and spaced apart a predetermined distance to reduce the thickness and increase the density of the batt. Heat is applied to the web structure at a temperature sufficient to soften the binder fibers but low enough to avoid melting the carrier fibers. The plastic memory of the softened binder fibers is released in their compressed configuration and the fibers fuse to themselves and to the other web fibers to form a batt having interconnected and fused fibers. The batt is cooled in its compressed state to reset the plastic memory of the binder fibers and form a thermal bonded batt having a density and thickness substantially the same as induced in the batt by the vacuum pressure or compression.

In products which require additional loft, compressibility, resilience and comfort or a light color beneath decorative upholstery, a mattress quilt or other covering for aesthetic purposes, an additional web comprising nonwoven fibers which are light in color can be formed. A surface of the nonwoven web is disposed to a surface of the blended charring fiber web to form a batt which is heated, compressed and cooled together. Alternatively, the charring fiber web and the nonwoven web can be heated, compressed and cooled separately and then disposed together to form the batt.

The thermal bonded batt has a wide variety of applications in products, depending on its charring fiber content and the density of the batt. For example, a batt having a density of less than 1.5 pounds per cubic foot, defined herein as a hi loft batt, can be used as a fire barrier layer in mattresses and border panels of mattresses and as a wrap for or an additional layer to cushion seats, backs and arms in furniture, vehicle and aircraft seats. In mattresses and seats having a light colored decorative covering, the batt comprising a layer of nonwoven fibers would be positioned with the light colored nonwoven layer proximate the decorative covering to shield it from the dark color charring PAN fibers. The thermally bonded hi-loft batt is also suitable as an insulation lining in apparel and fire safety gear such as, for example, in fire fighter jackets and oven mitts for welding or industrial furnace purposes. Further, the hi-loft batt is suitable as a fire barrier air filter and as an insulator for appliances such as hot water tanks and furnaces. Wall insulation and insulation in recreational vehicle wall cavities are also suitable applications of the hi-loft batt.

Batts formed from the method of the present invention having a density of about 1.5 pounds per cubic foot or greater, defined herein as densified, are suitable as a replacement to cushion backs, seats and arms in furniture, vehicle and aircraft seats. The densified batts are also suitable in toppers and filling in mattresses, as well as replacements for mattress cores, such as, for example, the foam or inner springs in mattresses, particularly for use in public occupancies and correctional institutions. Additionally, densified batts are suitable for insulation lining in apparel and safety gear such as race driver suits, and as insulation for walls, furnace wall insulation, and ducting insulation. Densified batts are particularly suitable for sound deadening and thermal transfer applications.

In yet another embodiment of the method of the present invention, a resin is used to bond carrier fibers and oxidized PAN fibers to form a fire combustion modified batt of the present invention. In this embodiment, carrier fibers having a relatively high melting point are blended with oxidized PAN fibers to form a homogeneous mixture. While the homogeneous mixture can be any of a number of suitable blends, the oxidized PAN fibers can be in the range of about 15 percent to 100 percent by volume of the ban and, accordingly, the volume of carrier fibers would be from 85 percent to a negligible amount. Thus, for a blend having 85 percent charring fibers, the volume of carrier fibers would be about 15 percent. The blended oxidized PAN and carrier fibers can be formed into a web generally according to the garnett method for forming the thermally bonded web described herein. An air laying machine can also be used. Generally, the fibers are introduced into an air stream which carries the fibers to an air permeable support such as a perforated drum which is rotating. Accumulation of the fibers onto the drum surface results in a web formation. A vacuum is applied though the web from one side of the web to the other and through said air permeable support sufficient to reduce the thickness and increase the density of the web throughout the thickness of the web to form a batt. The batt is saturated with a heat curable resin which can additionally comprise fire resistant properties to enhance the fire resistance of the batt. Heat is applied at a temperature sufficient to cure the resin and fuse the fibers to form a batt having a density and thickness substantially the same as during the heating step. For products requiring additional loft, compressibility, resilience and comfort or a light color, a web comprising nonwoven fibers can be formed. A surface of the nonwoven web is disposed to a surface of the oxidized PAN fiber web to form a batt which is saturated with a resin and heated to cure the resin. Alternatively, the oxidized PAN fiber web and the nonwoven web can be separately saturated with resin, heat cured and then bonded together by suitable bonding applications. In addition, a relatively thin layer of a nonwoven fiber which is light in color can be bonded to the resin bonded ban for aesthetic purposes where loft, compression and comfort are not required.

While the resin bonded batt can be hi-loft, preferably it is a densified batt having a density of about 1.5 pounds per cubic foot or greater. Preferably, the batt is relatively thin, having a thickness in the range of approximately ⅛ inch to approximately 1 inch. The resin bonded densified batt can be used as a fire barrier layer in a mattress, such as for example, directly below the ticking, under the quilt backing, under the quilt panels or borders and above the inner springs. Other suitable applications include as dust covers in mattresses and furniture. The densified resin bonded batt is also suitable as a wrap for cushion seats, backs and arms and for deck padding for furniture and curtain backing material. Further applications include wraps for hot water tanks and furnaces and fire and heat shields in building and vehicle walls.

While heat and resin bonding methods are discuss, other methods for bonding the fibers of the web to form the batt of the present invention are suitable, such as, for example, needle punching, hydro-entangling and mechanical bonding, and are within in the scope of the present invention.

The invention is more particularly shown and described in the accompanying drawings and materials included herein.

BRIEF DESCRIPTION OF THE DRAWINGS

For a more complete understanding of the present invention, and for further details and advantages thereof, reference is now made to the following Detailed Description of the Drawings taken in conjunction with the accompanying drawings, in which.

DETAILED DESCRIPTION OF THE DRAWINGS

The method for forming a fire combustion modified batt of the present invention comprises a process for bonding web fibers together to form a batt. The bonding processes discussed herein include a thermal bonding process and a resin saturated curing process. However, other methods may be suitable for bonding web fibers together to form a fire combustion modified batt and thus are within the scope of the invention. For example, needle punching, hydro entangling and mechanical bonds are suitable.

Figure 1:
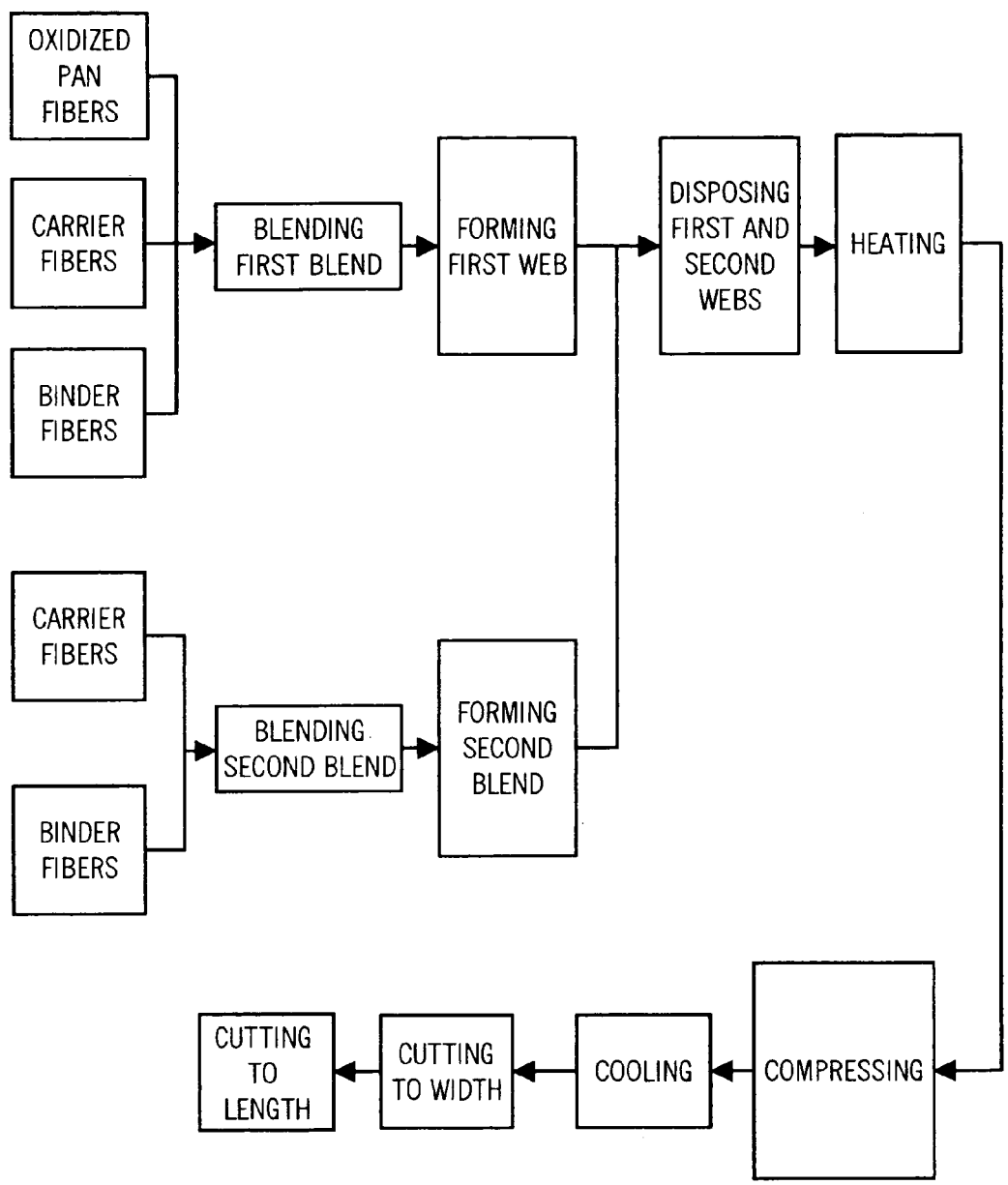
FIG. 1 provides a schematic flow chart of a method according to an embodiment of the present invention.

Turning first to the thermal bonding process which is representatively and schematically illustrated in FIG. 1, the method comprises the step of blending nonwoven fibers and oxidized polyacrylonitrile (PAN) fibers, to form a first web blend. For purposes of illustrating the process and not by way of limitation, the oxidized PAN fibers of the present invention may be those marketed under the product name Pyron by Zoltek Corporation. The oxidized polyacrylonitrile (PAN) fibers we produced from an acrylic precursor. Specifically, the Pyron oxidized PAN fiber is a stabilized form of polyacrylonitrile (PAN) fiber. The stabilization is an oxidation process that converts the polyacrylonitrile (PAN) fiber from a thermoplastic state to a thermoset state.

The discussion herein illustrates generally the method for forming, and the composition of oxidized PAN fibers but is not a limitation to the scope of the invention. Other methods and compositions may be suitable for the present invention as would be understood by one skilled in the art. Generally, several types of acrylic polymers with variations in their composition have been used for the production of oxidized PAN fibers. The exact composition of a particular acrylic precursor varies widely. Generally, however, the composition contains a minimum of 85% acrylonitrile and a maximum of 15%, but preferably no more than 8%, comonomers such as methyl methacrylate, methyl acrylate, vinyl acetate, vinyl chloride, and other monovinyl compounds.

In addition to acrylic as a precursor for the production of carbon fibers, rayon and pitches are also used. The details of the conversion processes used for different precursors are not the same, although their essential features are similar. Generally, the processes involve a stabilizing treatment to prevent melting or fusion of the fiber, a carbonizing treatment to eliminate the non-carbon elements and a high temperature graphitizing treatment to enhance the mechanical properties of the final carbon fiber.

In the case of PAN fibers, stabilization is carried out by controlled heating of the precursor fiber in an oxidizing atmosphere, for example, in air in the temperature range of about 180° C. to 300° C. The heating rate is usually 1–2° C./minute. However, other temperature ranges and heating rates may be appropriate. Shrinkage can be minimized by stretching the fibers along their axis during the low-temperature stabilization treatment. Stretching also produces oxidized PAN fibers with a high degree of preferred orientation along the fiber axis. The stabilization process produces changes in chemical structure of the acrylic precursor such that the product becomes thermally stable to subsequent high temperature treatments. During this process, the fibers change in color to black. The black fibers are carbonized in an inert atmosphere at high temperatures, for example at 1000 to 1500° C. with a slow heating rate to avoid damage to the molecular order of the fiber. The fibers are given a graphitizing treatment at high temperatures for example, above 2000° C. to 3000° C., to improve the texture of the fiber and to enhance the Young's modulus. The strength and the modulus of the fibers can also be improved by hot stretching.

Generally, the physical characteristics of oxidized PAN fibers are its black color, a moisture content of about 4 to 9 percent, an average fiber diameter of about 11 to 14 microns, a fiber tensile strength of about 180 to 300 Mpa, a fiber elongation of about 18 to 28 percent, a fiber density of about 1.36 to 1.38 g/cc and a fiber length of about 4 to 15 cm. In addition, in the case of Pryon®, the oxidized PAN fibers are thermally stable up to 600° F. The physical and chemical properties may vary depending on the specific manufacturing process.

The nonwoven fibers of the first blend for the present invention include carrier fibers and binder fibers. The fibers can be natural or synthetic. For example, thermoplastic polymer fibers such as polyester are suitable synthetic fibers. Other fibers can be used depending upon the precise processing limitations imposed and the characteristics of the batt which are desired at the end of the process. For purposes of illustrating the process and combustion modified batt and not by way of limitation, the carrier fiber is KoSa Type 209, 6 to 15 denier, 2 to 3 inches in length, round hollow cross section polyester fiber. Alternatively, the carrier fiber is KoSa Type 295, 6 to 15 denier, ⅕ to 4 inches in length, pentalobal cross section polyester fiber. Other nonwoven fibers are suitable as carrier fibers for the present invention and are within the scope of this invention.

The binder fiber has a relatively low predetermined melting temperature as compared with the carrier fiber. As used herein, however, the term melting does not necessarily refer only to the actual transformation of the solid polyester binder fibers into liquid form. Rather, it refers to a gradual transformation of the fibers or, in the case of a bicomponent sheath/core fiber, the sheath of the fiber, over a range of temperatures within which the polyester becomes sufficiently soft and tacky to cling to other fibers within which it comes in contact, including other binder fibers having its same characteristics and, as described above, adjacent polyester fibers having a higher melting temperature. It is an inherent characteristic of thermoplastic fibers such as polyester that they become sticky and tacky when melted, as that term is used herein. For purposes of illustrating the process and fire combustion modified batt and not by way of limitation, the binder fiber is KoSa Type 254 Celbond® which is a bicomponent fiber with a polyester core and a copolyester sheath. The sheath component melting temperature is approximately 230° F. (110° C.). The binder fiber, alternatively, can be a polyester copolymer rather than a bicomponent fiber.

While the homogeneous mixture of nonwoven fibers and oxidized PAN fibers can be any of a number of suitable fiber blends, for purposes of illustrating the process and first blend, the mixture is comprised of binder finders in an amount sufficient for binding the fibers of the blend together upon application of heat at the appropriate temperature to melt the binder fibers. In one example, the binder fibers are in the range of approximately 5 percent to 50 percent by total volume of the blend. Preferably, the binder finders are present in the range of approximately 10 percent to 15 percent for a hi loft batt, and in the range of approximately 15 percent to 40 percent for a densified batt, as those characteristics we discussed below. The relative percent volume of oxidized PAN fibers to carrier fibers in the remaining blend volume ranges anywhere from 15 percent to 85 percent. In the preferred embodiment, the relative volume of oxidized PAN fibers to carrier fibers is about 50 percent to 50 percent. Thus, for example, a blend having 10 percent by volume of binder fibers and a 50 to 50 percent relative volume of oxidized PAN fibers to carrier fibers, the volume of oxidized PAN fibers and carrier fibers in the blend is 45 percent each. In another example, the volume of oxidized PAN fibers and carrier fibers in the blend is 45 percent each. In a further example, the volume of oxidized PAN fibers and carrier fibers having a 50 to 50 percent relative volume is 40 percent each in a blend having 20 percent by volume of binder fibers. In a further example, a blend having 20 percent binder fibers and a 75 percent to 25 percent relative volume mix of oxidized PAN fibers to carrier fibers, the volume of oxidized PAN fibers and carrier fibers is 60 percent and 20 percent, respectively. Blends having other percentages of binder, carrier and oxidized PAN fibers are also within the scope of the invention.

Referring back to FIG. 1, the method further comprises an optional step of blending a homogenous second blend of carrier and binder fibers to form a second web. The fibers can be the same as or similar to those of the first web discussed herein, such as, for example, polyester fibers. Other synthetic or natural fibers can be used depending upon the precise processing limitations imposed and the characteristics of the second web which are desired at the end of the process. While the homogeneous mixture of carrier and binder fibers can be any of a number of suitable fiber blends, for purposes of illustrating the process and second blend, the mixture is comprised of binder finders in the range of approximately 10 percent to 20 percent by volume and carrier fibers in the range of approximately 90 to 80 percent by volume. Preferably, the binder finders and carrier fibers are present in the range of approximately 10 percent to 15 percent and approximately 90 to 85 percent by volume, respectively.

Figure 2:
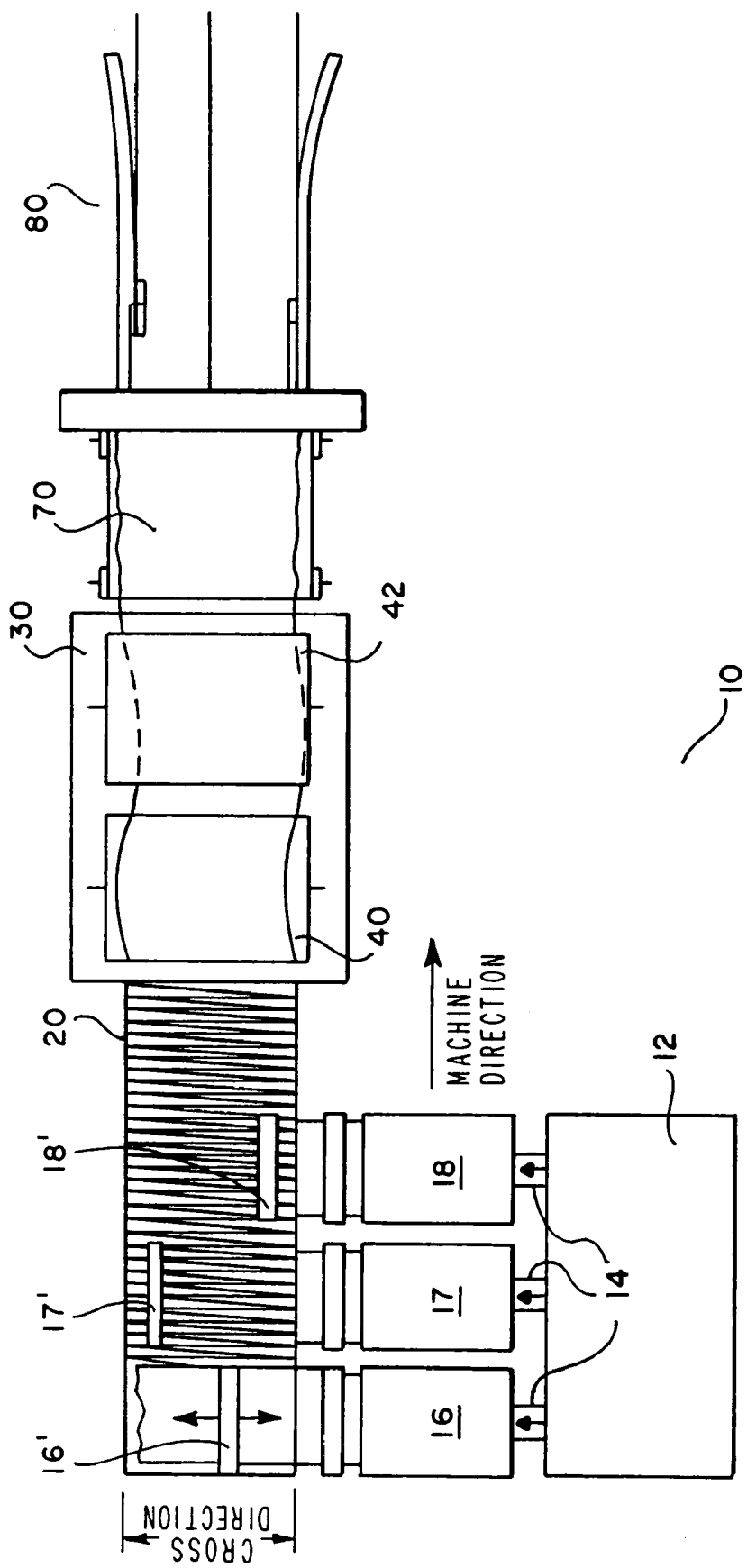
FIG. 2 provides a schematic top plan view of the processing line for forming a batt according to an embodiment of the method of the present invention.

Referring to FIG. 2, a schematic top plan view of the general processing line 10 for forming a batt of the present invention is illustrated. The following example is directed to the formation of a web in general and thus is applicable to forming both the first web comprising oxidized PAN fibers and nonwoven fibers and the second web of nonwoven fibers. As discussed above, fibers are blended in a fiber blender 12 and conveyed by conveyor pipes 14 to a web forming machine or, in this example, three machines 16, 17, 18. A suitable web forming apparatus is a garnett machine. An air laying machine, known in the trade as a Rando webber, or any other suitable apparatus can also be used to form a web structure. Garnett machines 16, 17, 18 card the blended fibers into a nonwoven web having a desired width and deliver the web to cross-lappers 16', 17', 18' to cross-lap the web onto a slat conveyor 20 which is moving in the machine direction. Cross-lappers 16', 17' 18' reciprocate back and forth in the cross direction from one side of conveyor 20 to the other side to form the web having multiple thicknesses in a progressive overlapping relationship. The number of layers which make up the web is determined by the speed of the conveyor 20 in relation to the speed at which successive layers of the web are layered on top of each other and the number of cross-lappers 16', 17', 18'. Thus, the number of single layers which make up the web can be increased by slowing the relative speed of the conveyor 20 in relation to the speed at which cross layers are layered, by increasing the number of cross-lappers 16', 17' 18' or both. Conversely, a fewer number of single layers can be achieved by increasing the relative speed of conveyor 20 to the speed of laying the cross layers, by decreasing the number of cross-lappers 16', 17', 18' or both. In the present invention, the number of single layers which make up the first web of oxidized PAN and nonwoven fibers and the second web of nonwoven fibers can be approximately the same or can vary depending on the desired characteristics of the fire combustion modified batt of the present invention. Accordingly, the relative speed of the conveyor 20 to the speed at which cross layers are layered and the number of cross-lappers 16', 17', 18' for forming the first web and the second web may be different.

Referring back to FIG. 1, the process of the present invention further comprises disposing a surface of the first web in a conforming relationship to a surface of the second web to form the fire combustion modified batt.

While there are a variety of thermal bonding methods which are suitable for the present invention, one such method comprises holding the batt by vacuum pressure applied through perforations of first and second counter-rotating drums and heating the batt so that the relatively low melting temperature binder fibers in the first web and the second web soften or melt to the extent necessary to fuse the low melt binder fibers together and to the charring and carrier fibers in the first and second webs. Alternatively, the batt moves through an oven by substantially parallel perforated or mesh wire aprons to melt the low temperature binder fibers.

Figure 3A:
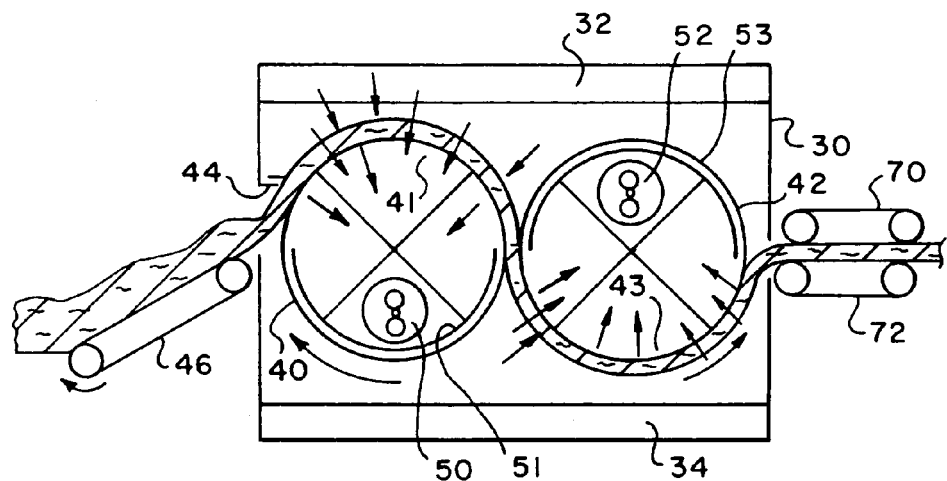
FIG. 3A provides a schematic side view of a thermal bonding apparatus according to an embodiment of the method of the present invention.

Referring to FIGS. 2 and 3A, a vacuum pressure method generally comprises using counter-rotating drums 40, 42 having perforations 41, 43, respectively, which are positioned in a central portion of a housing 30. Housing 30 also comprises an air circulation chamber 32 and a furnace 34 in an upper portion and a lower portion, respectively, thereof. Drum 40 is positioned adjacent an inlet 44 though which the batt is fed. The batt is delivered from the blending and web forming processes described herein by means of an infeed apron 46. A suction fan 50 is positioned in communication with the interior of drum 40. The lower portion of the circumference of drum 40 is shielded by a baffle 51 positioned inside drum 40 so that the suction-creating air flow is forced to enter drum 40 through perforations 41 which are proximate the upper portion of drum 40 as it rotates.

Drum 42 is downstream from drum 40 in housing 30. Drums 40, 42 can be mounted for lateral sliding movement relative to one another to facilitate adjustment for a wide range of batt thicknesses (not shown). Drum 42 includes a suction fan 52 which is positioned in communication with the interior of drum 42. The upper portion of the circumference of drum 42 is shielded by a baffle 53 positioned inside drum 42 so that the suction-creating air flow is forced to enter drum 42 through perforations 43 which are proximate the lower portion of drum 42 as it rotates.

The batt is held in vacuum pressure as it moves from the upper portion of rotating drum 40 to the lower portion of counter rotating drum 42. Furnace 34 heats the air in housing 30 as it flows from perforations 41, 43 to the interior of drums 40, 42, respectively, to soften or melt the relatively low melting temperature binder fibers in the first and second webs to the extent necessary to fuse the low melt binder fibers together and to the charring and carrier fibers in the first and second webs.

Figure 3B:
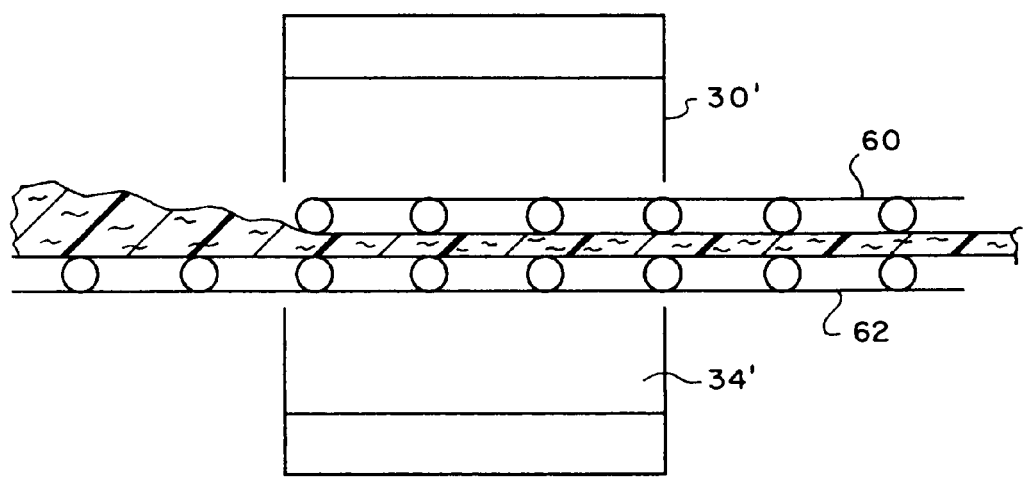
FIG. 3B provides a schematic side view of another embodiment of a thermal bonding apparatus according to the method of the present invention.

REFERRING TO FIG. 3B, in an alternative thermal bonding process, the batt enters housing 30' by a pair of substantially parallel perforated or mesh wire aprons 60, 62. Housing 30' comprises an oven 34' which heats the batt to soften or melt the relatively low melting temperature binder fibers in the first and second webs to the extent necessary to fuse the low melt binder fibers together and to the charring and carrier fibers in the first and second webs.

Referring back to FIGS. 2, 3A and 3B, the batt is compressed and cooled as it exits from housing 30, 30' by a pair of substantially parallel first and second perforated or wire mesh aprons 70, 72. Aprons 70, 72 are mounted for parallel movement relative to each other to facilitate adjustment for a wide range of batt thicknesses (not shown). The batt can be cooled slowly through exposure to ambient temperature air or, alternatively, ambient temperature air can forced through the perforations of one apron, through the batt and through the perforations of the other apron to cool the batt and set it in its compressed state. The batt is maintained in its compressed form upon cooling since the solidification of the low melt temperature binder fibers in their compressed state bonds the fibers together in that state.

Referring to FIGS. 1 and 2, the cooled batt moves into cutting zone 80 where its lateral edges are trimmed to a finished width and it is cut transversely to the desired length of batt.

Figure 4:
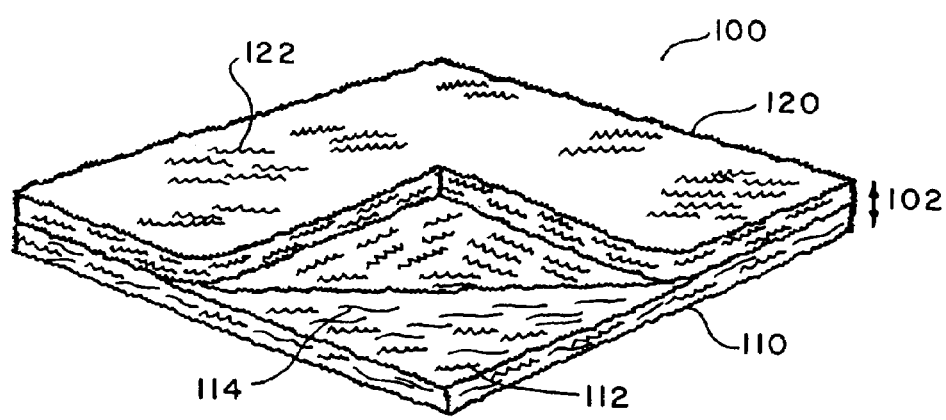
FIG. 4 provides a perspective top view of an embodiment of a batt formed from the method of the present invention.
Figure 5:
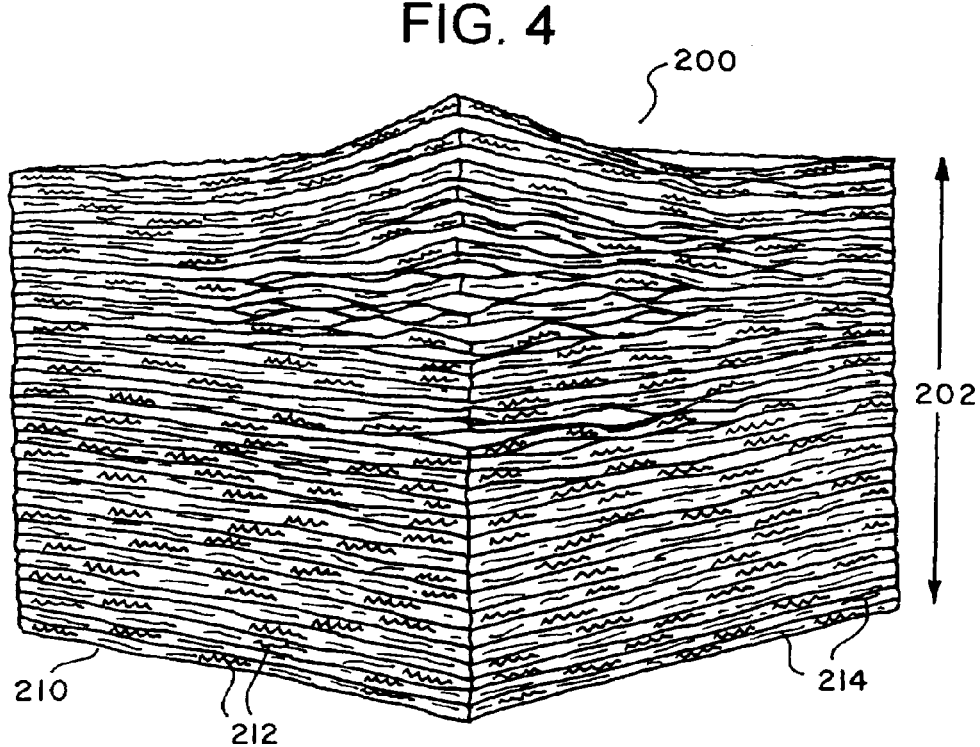
FIG. 5 provides a perspective top view of another embodiment of a batt formed from the method of the present invention.

Referring TO FIGS. 4 and 5, an example of batt 100 and batt 200 formed by the thermal bonding method of the present invention is illustrated. Batt 100 is comprised of first web 110 having nonwoven fibers 112 and oxidized PAN fibers 114, and second web 120 having nonwoven fibers 122 as discussed previously. Batt 200 is comprised of first web 210 having nonwoven fibers 212 and oxidized PAN fibers 214. The weight, density and thickness 102, 202 of batt 100, 200, respectively, are determined by, among other factors, the process of compressing the batt as it is cooled. The ratio of batt density to batt thickness 102 generally dictates whether batt 100 is a hi loft batt or a densified batt. For purposes herein, a densified batt has approximately a 2 to 1 or greater ratio of weight in ounces per square foot to thickness in inches. Accordingly, a densified batt has a density of approximately 1.5 pounds per cubic foot or more. Batts have less than a 2 to 1 ratio of weight to thickness and less than 1.5 pounds per cubic foot density are defined herein as hi-loft batts. For illustration purposes, batt 100 is a hi-loft batt while batt 200 is densified. Tables I, II and III provides examples of various weights and corresponding thicknesses of batts processed by the thermal bonding method of the present invention.

TABLE I*

| Weight (oz/sq.ft.) | Thickness (inches) |
|---|---|
| 1/4–1/2 | 1/2 |
| 1/2–3/4 | 3/4 |
| 3/4–1 | 7/8 |
| 1–1 1/4 | 1 1/4 |
| 1 1/4–1 1/2 | 1 1/2 |
| 1 1/2–1 3/4 | 1 3/4 |
| 1 3/4–2 | 2 |
| 2–2 1/4 | 2 1/4 |
| 2 1/4–2 3/4 | 2 3/4 |
| 2 3/4–3 | 3 |
| 3–3 1/2 | 3 1/2 |
| 3 1/2–4 | 4 |

*Suitable blends for the weights and thicknesses in Table I are thermally bonded batts having bicomponent low melt binder fibers in the amount of approximately 10 percent to 20 percent by total volume of the blend. The remaining blend volume comprises a relative percent volume ofoxidized PAN fibers to carrier fibers in the range of approximately 15 percent to 85 percent by relative volume.

TABLE II*

| Weight (oz/sq.ft.) | Thickness (inches) |
|---|---|
| 3/8–3/4 | 1/4 |
| 3/4–1 1/2 | 1/2 |
| 1 1/8–2 1/4 | 3/4 |
| 1 3/8–2 3/8 | 7/8 |
| 1 1/2–3 | 1 |
| 1 5/8–3 3/8 | 1 1/8 |
| 1 7/8–3 3/4 | 1 1/4 |
| 2 1/4–4 1/2 | 1 1/2 |
| 2 5/8–5 1/4 | 1 3/4 |
| 3–6 | 2 |
| 3 1/4–6 3/8 | 2 1/8 |
| 3 3/8–6 3/4 | 2 1/4 |
| 3 3/4–7 1/2 | 2 1/2 |
| 4 1/8–8 1/4 | 2 3/4 |
| 4 1/2–9 | 3 |

*Suitable blends for the weights and thicknesses in Table II are thermally bonded batts having bicomponent low melt binder fibers in the amount of approximately 10 percent to 20 percent by total volume of the blend. The remaining blend volume comprises a relative percent volume ofoxidized PAN fibers to carrier fibers in the range of approximately 15 percent to 85 percent by relative volume. The batts are compressed to a ratio of weight (ounces per square foot) to thickness (inches) in the range of about 1.5 to 1 ratio up to about 3 to 1 ratio.

TABLE III*

| Weight (oz/sq.ft.) | Thickness (inches) |
|---|---|
| 4–6 1/4 | 3 1/8 |
| 4 1/8–6 1/2 | 3 1/4 |
| 4 3/8–7 | 3 1/2 |
| 4 5/8–7 1/2 | 3 3/4 |
| 5–8 | 4 |
| 5 1/8–8 1/4 | 4 1/8 |
| 5 1/4–8 1/2 | 4 1/4 |
| 5 5/8–9 | 4 1/2 |
| 5 7/8–9 1/2 | 4 3/4 |
| 6 1/4–10 | 5 |
| 6 3/8–10 1/4 | 5 1/8 |
| 6 1/2–10 1/2 | 5 1/4 |
| 6 7/8–11 | 5 1/2 |
| 7 1/4–11 1/2 | 5 3/4 |
| 7 1/2–10 1/2 | 6 |
| 7 5/8–10 5/8 | 6 1/8 |
| 7 7/8–11 | 6 1/4 |
| 8 1/8–11 3/8 | 6 1/2 |
| 8 1/2–10 1/8 | 6 3/4 |
| 8 3/4–10 1/2 | 7 |
| 8 7/8–10 2/3 | 7 1/8 |
| 9–10 7/8 | 7 1/4 |
| 9 3/8–11 1/4 | 7 1/2 |
| 9 5/8–11 1/16 | 7 3/4 |
| 10–12 | 8 |

*Suitable blends for the weights and thicknesses in Table III are thermally bonded batts having bicomponent low melt binder fibers in the amount of approximately 10 percent to 20 percent by total volume of the blend. The remaining blend volume comprises a relative percent volume of oxidized PAN fibers to carrier fibers in the range of approximately 15 percent to 85 percent by relative volume. The batts are compressed to a ratio of weight (ounces per square foot) to thickness (inches) in the range of about 1.25 to 1 ratio up to about 2 to 1 ratio.

Figure 6:
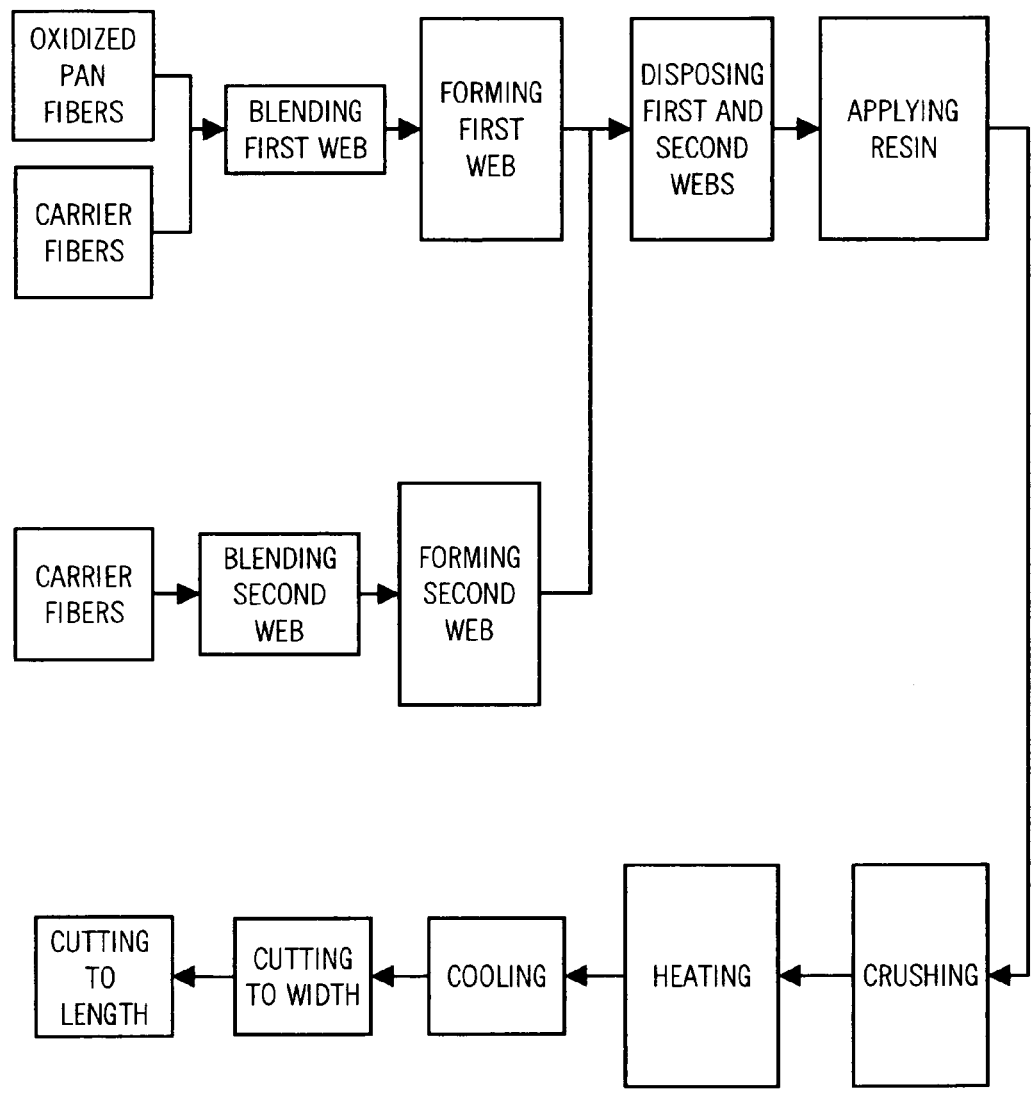
FIG. 6 provides a schematic flow chart of a method according to another embodiment of the present invention.

Referring to FIG. 6, the method for forming the fire combustion modified batt comprising resin bonding process is representatively and schematically illustrated. Oxidized PAN fibers and carrier fibers are blended to form a first web. Low melt temperature binder fibers are not required as a heat curable binder material is used. The oxidized PAN fibers and carrier fibers of the blend for the thermal bonding process are suitable for this application as well. For example, Pyron® is a suitable oxidized PAN fiber, and thermoplastic fibers such as polyester, and more specifically, KoSa Type 209 or KoSa Type 295 are suitable carrier fibers. However, other synthetic and natural fibers can be used depending upon the precise processing limitations imposed and the characteristics of the batt which are desired at the end of the process. While the mixture of oxidized PAN fibers and carrier fibers in the first web for the resin bonding method can be any of a number of suitable fiber blends, for purposes of illustrating the process, the first blend is comprised of oxidized PAN fibers in the range of approximately 15 percent to 100 percent by volume and corresponding carrier fibers in the range of approximately 85 percent to a negligible amount.

Referring back to FIG. 5, the resin bonding method can also optionally comprise a second blend of carrier nonwoven fibers to form a second web. The nonwoven fibers can be the same as or similar to those blended with the charring fibers discussed above, such as, for example, polyester thermoplastic polymer fibers. Other synthetic or natural fibers can be used depending upon the precise processing limitations imposed and the characteristics of the second web which are desired at the end of the process.

The resin bonding method further comprises forming a first web and a second web, from first and second blends, respectively, using web forming machines such as garnetts, cross-lappers or air laying apparatus. The method also comprises the step of disposing a surface of the first web in a conforming relationship to a surface of the second web to form the batt. While the second nonwoven web provides a lighter color to a surface of the batt and may impart additional loft and comfort, alternatively, a relatively thin layer of a nonwoven facing material may be suitable for reinforcement to the first web of charring and carrier fibers. The web and batt forming steps for the resin bonding method are generally similar to those for the thermal bonding process which details are discussed above. An air laying machine can also be used. Generally, the fibers are introduced into an air stream which carries the fibers to an air permeable support such as a perforated drum which is rotating. Accumulation of the fibers onto the drum surface results in a web formation. A vacuum is applied through the web from one side of the web to the other and through said air permeable support sufficient to reduce the thickness and increase the density of the web throughout the thickness of the web to form a batt.

Referring back to the schematic of FIG. 6, heat curable resin is applied to the batt for bonding the web fibers. While there are a variety of applications, generally resin in the form of liquid is sprayed while froth resin is extruded onto the batt. Alternatively, the batt is fed or dipped into a bath of resin. Resins suitable for the present invention are curable by heat and can be any of a variety of compositions. Generally, the resin is comprised of latex or acrylic binders. Additionally, the resin can comprise fire resistant chemicals which further enhance the fire resistance of the finished batt.

In the application of liquid resin, as the batt moves along a conveyor in the machine direction, the resin is sprayed onto the batt from one or more spray heads which move in a transverse or cross direction to substantially coat the batt. Froth resin is extruded onto the batt using a knife or other means. The batt could also be fed through or dipped into a resin bath. The applied resin is crushed into the batt for saturation therethrough by nip rollers which are disposed along the transverse direction of the conveyor to apply pressure to the surface of the batt. Alternatively, the resin is crushed into the batt by vacuum pressure applied through the batt. The batt moves into an oven heated to a temperature which cures the resin. The batt exits the oven and is cooled. The batt is maintained substantially in its oven state upon cooling since the heat cures the resin which bonds the fibers of the batt together in this state. The batt moves into a cutting zone where its lateral edges are trimmed to a finished width and it is cut transversely to the desired length.

Figure 7:
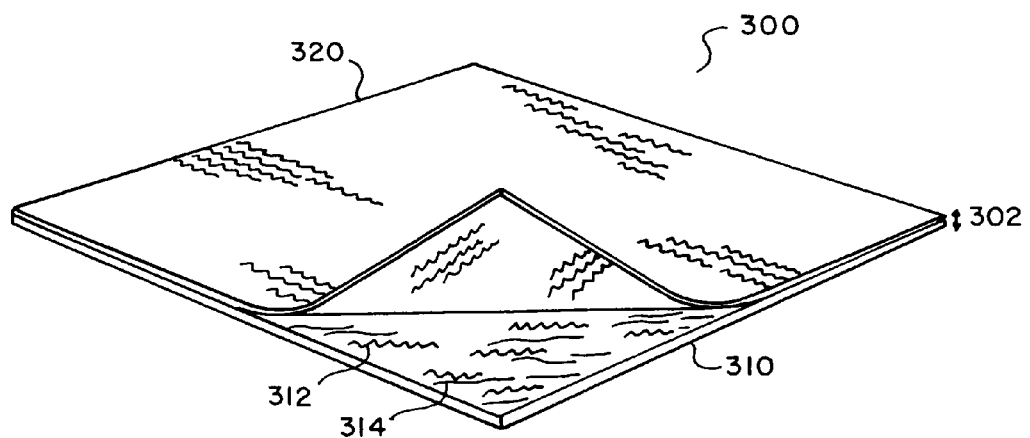
FIG. 7 provides a perspective top view of further embodiment of a batt formed from the method of the present invention.

Referring to FIG. 7, an example of batt 300 formed by the resin saturated bonding method of the present invention is illustrated. Batt 300 is comprised of first web 310 having carrier fibers 312 and charring fibers 314 and a relatively thin nonwoven layer 320. The weight, density and thickness 302 of batt 300 are determined by, among other factors, the heating process which cures the resin and fixes the web in this state. Batt 300 can be hi loft or densified depending on the processing conditions and the desired batt characteristics. As discussed herein, a densified batt has approximately a 2 to 1 or greater ratio of weight in ounces per square foot to thickness in inches which, in terms of density is approximately 1.5 pounds per cubic foot or more. For illustration purposes, batt 300 is densified. Table IV provides examples of various weights and corresponding thicknesses of batts processed by the resin bonding method of the present invention.

TABLE IV*

| Weight (oz/sq.ft.) | Thickness (inches) |
|---|---|
| ¼–¾ | ⅛–¼ |
| ¾–1½ | ¼–½ |
| 1½–3 | ½–1 |

*Suitable blends for the weights and thicknesses in Table IV are resin bonded batts having from 15 percent oxidized PAN fibers up to 100 percent and the remaining volume of polymer carrier fibers.

Figures 8A, 8B:
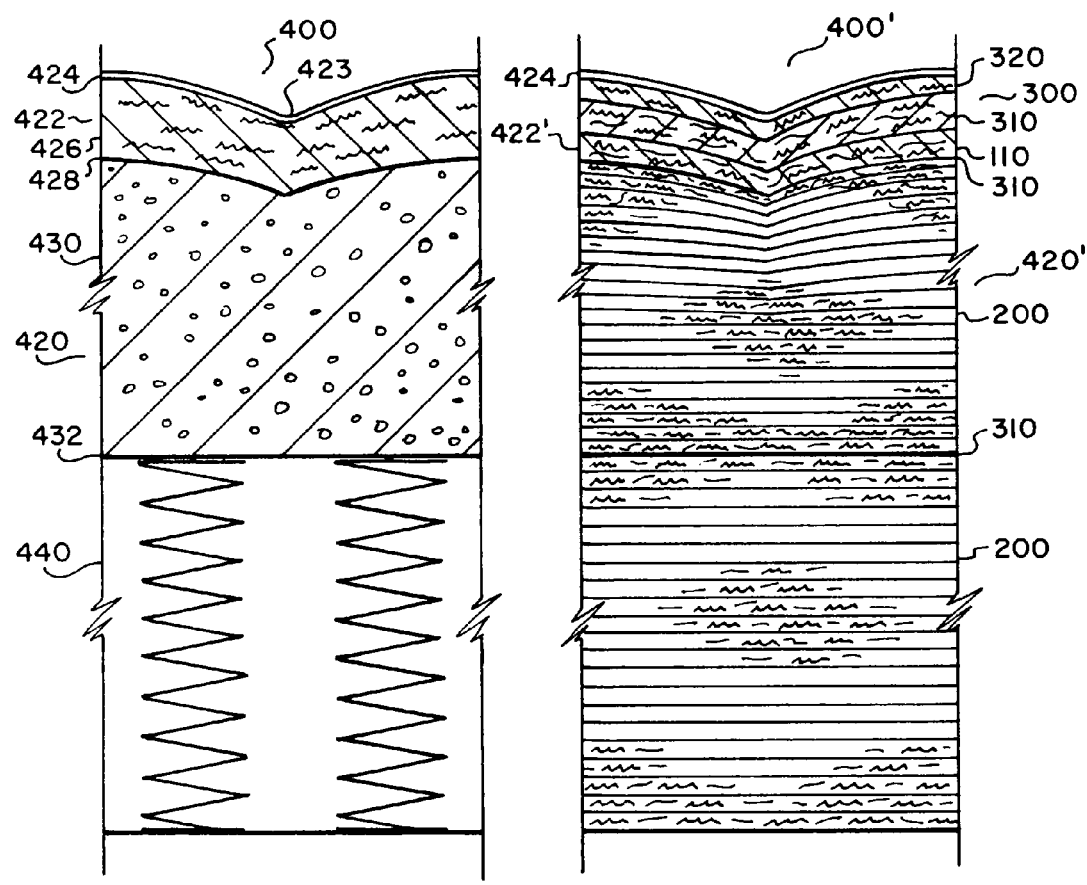
FIG. 8A is a side cut away view of a traditional mattress.
FIG. 8B is a side cut away view of a mattress comprising embodiments of batts formed from the method of the present invention.

Referring to FIGS. 8A and 8B, side views of a traditional mattress and one which incorporates the thermal and resin bonded batts of the present invention are provided. In the construction of a traditional mattress 400, upper structure 420 positioned over the coil structure 440 includes a quilt panel 422 comprising a cover or ticking 424, a layer of fiber 426 and a quilt backing 428. Ticking 424, fiber layer 426 and quilt backing 428 are stitched together and form quilt pattern 423. The quilt panel 422 provides loft, comfort and resilience to the mattress 400. Upper structure 420 of the mattress 400 further comprises a layer of foam filling 430 which imparts durability to the mattress 400 as the foam is relatively stiff as compared to a fiber layer. An insulator 432 separates the foam filling 430 from the coils 440 to minimize the wear of the foam filling 430 which coils 440 may impart. The lower structure positioned under the coil structure 440 is a mirror image of the upper structure 440 and thus is not shown.

Referring to FIGS. 4, 5, 7 and 8B, mattress 400' which incorporates the fire combustion modified batts of the present invention is shown. Quilt panel 422' of upper structure 420' is comprised of ticking 424, a resin bonded densified batt 300 having the light colored nonwoven layer 320 proximate the ticking 424, a thermally bonded hi-loft batt of charring and nonwoven fibers 110 and a resin bonded densified batt 310 which replaces quilt backing 428. The resin bonded batt 300 provides fire resistant properties to the mattress near its surface where a flame is likely to contact while providing a light color for aesthetic purposes. The thermal bonded hi loft fire combustion modified batt 110 provides sufficient loft, comfort and resilience to effectively replace the fiber layer 426 of the traditional mattress quilt panel 422 while imparting additional fire resistance to the mattress. Upper structure 420' of mattress 400' further comprises a thermally bonded densified batt 200 which replaces foam filling 430 to impart durability to mattress 400'. Insulator 432 is replaced with resin bonded batt 310 to enhance the fire resistant properties of mattress 400. A second thermally bonded densified batt 200 replaces the coil structure 440.

Figure 9:
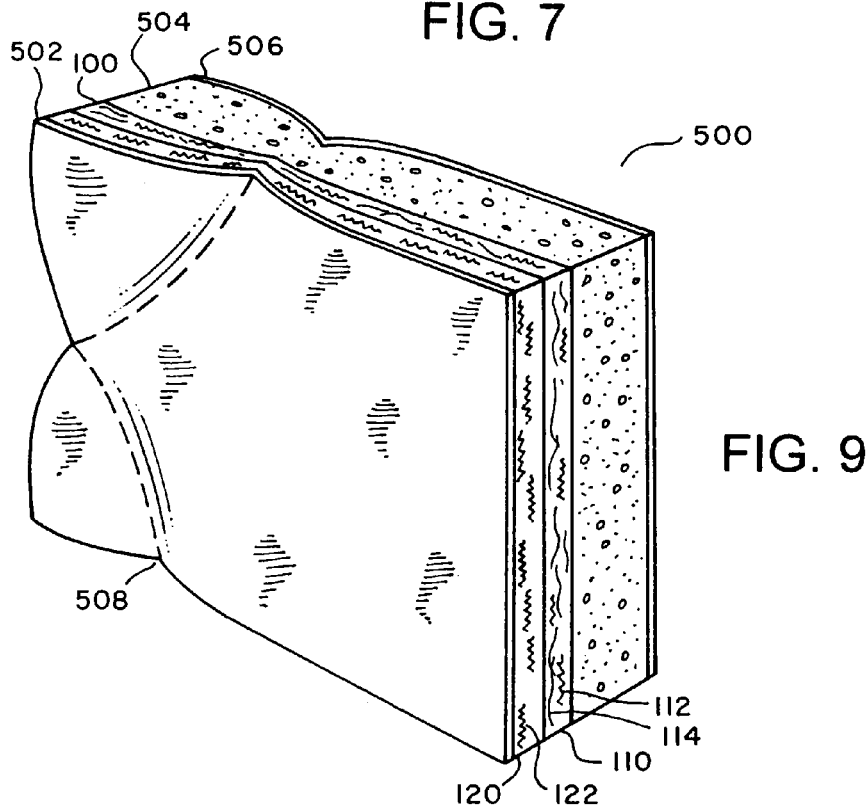
FIG. 9 is a side view of a mattress border comprising an embodiment of a batt formed from the method of the present invention.

Referring to FIG. 9, a mattress border 500 constructed of a thermally bonded hi loft batt 100 of the present invention is provided. Border 500 further comprises ticking 502, a foam layer 504 and a quilt backing 506. Batt 100 has a layer 120 of carrier and binder fibers 122 which is proximate ticking 502 and layer 110 of charring fibers 114 and carrier and binder fibers 112 which is proximate the foam layer 504. Ticking 502, batt 100, foam layer 504 and quilt backing 506 are stitched together and form quilt pattern 508. The thermal bonded hi loft fire combustion modified batt 100 provides loft, comfort and resilience to the border while providing fire resistant properties to the border and a light color layer 120 of carrier and binder fibers 122 proximate ticking 502 for aesthetic purposes.

The thermal and resin bonded batts formed from the methods of the present invention offer substantial advantages as fire barrier layers in a wide variety of products, particularly as mattress components described above. Fire tests conducted on three mattresses which incorporate various batts of the present invention were conducted under the State of California Technical Bulletin 129 Flammability Test Procedure for Mattresses for Use in Public Building, October 1992. A brief description of the test is as follows. A mattress is placed on a support system. Flames from a multi hole burner (fueled by propane at the rate of 12 l/min) impinge on the side of the mattress for a period of 180 seconds. Test observations are made. The tests were performed on mattresses comprising the fire combustion modified batts to determine, among other things, the burning behavior of the mattresses by measuring the response time which the fire barrier layers would provide to a fire victim to safely escape and a fire department to successfully extinguish the fire.

In a first test, a traditional mattress comprising a quilt panel of ticking, a polyester fiber layer, a urethane foam layer and a quilt backing, two layers of foam and an insulator proximate the coil structure was tested under the California Technical Bulletin 129. The test ended after 1 minute 27 seconds when unsafe escalating combustion was noted. In a second test, a thermally bonded hi loft batt replaced the polyester fiber layer beneath the ticking of a mattress described under the first test. The thermally bonded hi loft batt was comprised of a first layer of approximately 10 to 15 percent by volume of binder polyester fibers and the remaining volume was a 50 to 50 percent by volume blend of Pyrong oxidized PAN fibers and polyester carrier fibers. The batt further comprised a second layer of approximately 10 to 15 percent by volume of binder polyester fibers and the remaining volume was carrier polyester fibers. The weight of each layer was approximately 0.5 ounce per square inch for a total batt weight of about 1 ounce per square inch. The second test ended after 18 minutes 40 seconds before unsafe escalating combustion was noted. Thus, the use of a fire barrier layer in a mattress as described in the second test effectively increased the time by 17 minutes 13 seconds over the traditional mattress of the first test. This increase could provide valuable time for a fire victim to escape or a fire department to extinguish the fire.

In a third test, a densified resin bonded batt replaced the insulator proximate the coil structure of the traditional mattress of the first test. The densified batt was comprised of 50 percent by volume of oxidized PAN fibers and 50 percent by volume of polyester fibers and weighed about ¾ ounces per square foot. The third test ended after 30 minutes 43 seconds before unsafe escalating combustion was noted. Thus, the use of a densified batt formed from the method of the present invention substantially increases the time over the traditional mattress of the first test by 29 minutes 16 seconds.

The thermal and resin bonded batts formed from the methods of the present invention offer substantial advantages as fire barrier layers in other products as well. For example, a thermally bonded fire combustion modified batt having a density of less than 1.5 pounds per cubic foot, a hi loft batt, can be used as a wrap for or an additional layer to cushion seats, backs and arms in furniture, vehicle and aircraft seats. In seats having a light colored decorative covering, the batt comprising a layer of nonwoven fibers would be positioned with the light colored layer proximate the decorative covering to essentially hide the dark color oxidized PAN fiber. The thermally bonded hi-loft batt is also suitable as an insulation lining in apparel and fire safety gear such as, for example, in fire fighter jackets and oven mitts for welding or industrial furnace purposes. Further, the hi-loft batt is suitable as a fire barrier air filter and as an insulator for appliances such as hot water tanks and furnaces. Insulation for building walls and recreational vehicle wall cavities are also suitable applications of the hi-loft batt.

Thermal bonded batts formed from the method of the present invention having a density of about 1.5 pounds per cubic foot or greater, densified batts, are suitable as a replacement to cushion backs, seats and arms in furniture, vehicle and aircraft seats. The densified batts are also suitable as replacements for mattress cores, such as, for example, the foam or inner springs in mattresses, particularly for use in public occupancies and correctional institutions. Additionally, densified thermally bonded batts are suitable for insulation lining in apparel and safety gear such as race driver suits, and as insulation for walls, furnaces and ducting applications. Densified thermally bonded batts are particularly suitable for sound deadening and thermal transfer applications.

Resin bonded batts, preferably densified batts which are relatively thin, having a thickness in the range of approximately ⅛ inch to approximately ½ inch, have applications as dust covers in mattresses and furniture. Densified resin bonded batts are also suitable as wraps for cushion seats, backs and arms and for deck padding for furniture and curtain backing material. Further applications include wraps for hot water tanks and furnaces and fire and heat shields in building and vehicle walls.

While preferred embodiments have been shown and described, various modifications and substitutions may be made thereto without departing from the spirit and scope of the invention. Those skilled in the art will readily see other embodiments within the scope of the invention. Accordingly it is to be understood that the method for forming fire combustion modified batts of the present invention has been described by way of illustration only and not limitation.

What is claimed is:

1. A method for forming a fire combustion modified high-loft fiber batt suitable for use as a fire barrier layer in products requiring loft, compressibility and/or resilience, comprising:

forming a generally homogeneous blend consisting of about 42.5 volume percent to about 45 volume percent oxidized polyacrylonitrile fibers, about 42.5 volume percent to about 45 volume percent polyester carrier fibers and about 10 volume percent to about 15 volume percent polyester binder fibers, said polyester binder fibers having a relatively low melting temperature and said polyester carrier fibers having a relatively high melting temperature;

forming said blend of fibers into a web;

compressing said web to form a batt;

heating said batt at a temperature at or above the melting temperature of said polyester binder fibers and below the melting temperature of said polyester carrier fibers; and forming a fire combustion modified high-loft fiber batt having a ratio of weight in ounces per square foot to thickness in inches of less than about 2:1 while cooling said batt while compressed to fuse said polyester binder fibers to each other and to said polyester carrier fibers and said oxidized polyacrylonitrile fibers;

said fire combustion modified high-loft fiber batt suitable for use as a fire barrier layer in products requiring loft, compressibility and/or resilience.

2. Products using the fire combustion modified high-loft fiber batt of claim 1 as a fire barrier layer thereof, wherein said products are selected from the group consisting of bedding, upholstery, furniture and seats.

3. Mattresses using the fire combustion modified high-loft fiber batt of claim 1 as a fire barrier layer thereof.

4. A fire combustion modified high-loft fiber batt suitable for use as a fire barrier layer in products requiring loft, compressibility and/or resilience, comprising:

a web having a ratio of weight in ounces per square foot to thickness in inches of less than about 2:1, said web formed from a generally homogeneous blend consisting of (a) between about 42.5 volume percent and about 45 volume percent oxidized polyacrylonitrile, (b) between about 42.5 volume percent and about 45 volume percent polyester carrier fibers and (c) between about 10 volume percent and about 15 volume percent polyester binder, said polyester binder fibers having a low melting temperature relative to said polyester carrier fibers and said polyester carrier fibers having a high melting temperature relative to said polyester binder fibers, said polyester binder fibers being heat-fused to fuse said polyester binder fibers to said oxidized polyacrylonitrile fibers, to said polyester carrier fibers and to other polyester binder fibers.

5. Products using the fire combustion modified high-loft fiber batt of claim 4 as a fire barrier layer thereof, wherein said products are selected from the group consisting of bedding, upholstery, furniture and seats.

6. Mattresses using the fire combustion modified high-loft fiber batt of claim 4 as a fire barrier layer thereof.

* * * * *

UNITED STATES PATENT AND TRADEMARK OFFICE
CERTIFICATE OF CORRECTION

PATENT NO. : 7,244,322 B2
APPLICATION NO. : 10/968318
DATED : July 17, 2007
INVENTOR(S) : Ogle et al.

It is certified that error appears in the above-identified patent and that said Letters Patent is hereby corrected as shown below:

Col. 4, line 23, replace "ban" with -- batt --.

Col. 4, line 54, replace "ban" with -- batt --.

Col. 10, line 40, replace "ofoxidized" with -- of oxidized --.

Col. 10, line 63, replace "ofoxidized" with -- of oxidized --.

Col. 11, line 29, replace "ofoxidized" with -- of oxidized --.

Col. 14, line 32, replace "Pyrong" with -- Pyron® --.

In Claim 4, Col. 16, line 32, after "polyacrylonitrile", insert -- fibers --.

Signed and Sealed this

Thirteenth Day of May, 2008

JON W. DUDAS
*Director of the United States Patent and Trademark Office*